Figure 1:
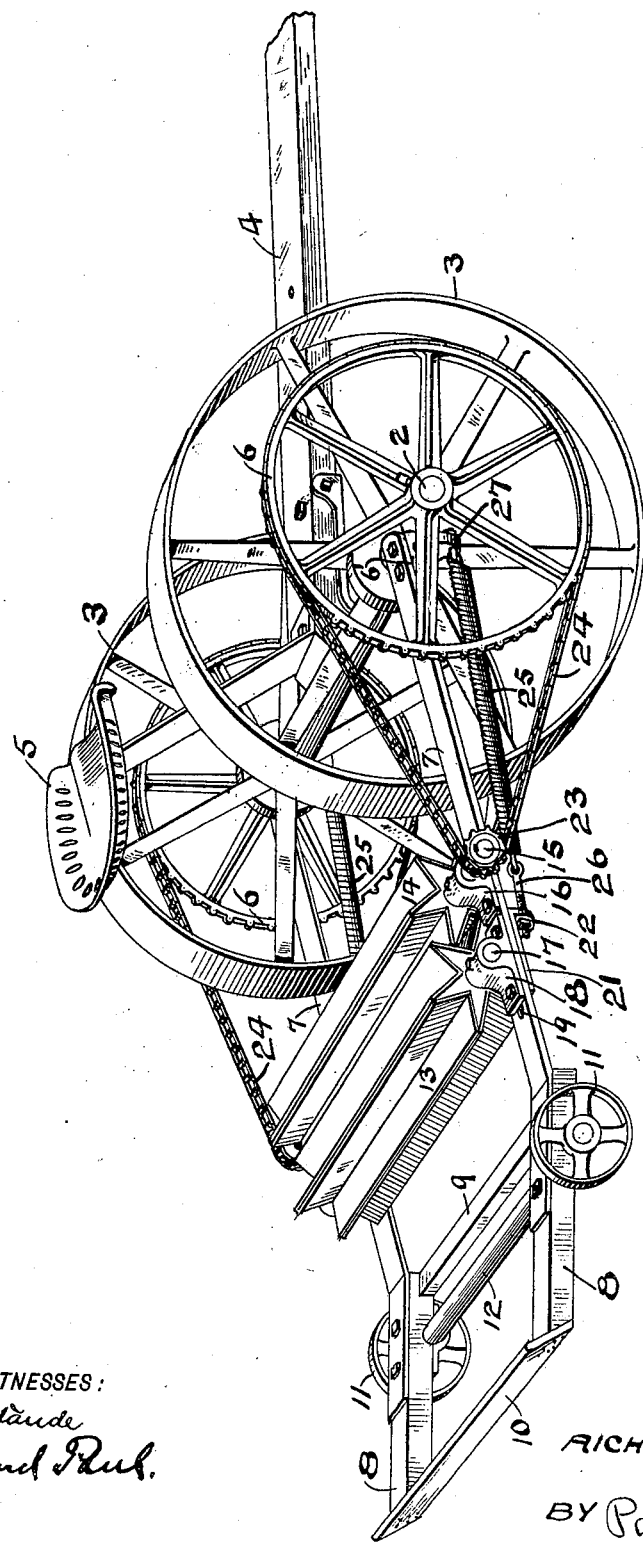

No. 639,618. Patented Dec. 19, 1899.
R. RUSSELL.
WEED PULLER.
(Application filed Dec. 5, 1898.)

(No Model.) 2 Sheets—Sheet 1.

WITNESSES:

INVENTOR
RICHARD RUSSELL
BY Paul & Hawley
ATTORNEYS

No. 639,618. Patented Dec. 19, 1899.
R. RUSSELL.
WEED PULLER.
(Application filed Dec. 5, 1898.)
(No Model.) 2 Sheets—Sheet 2.
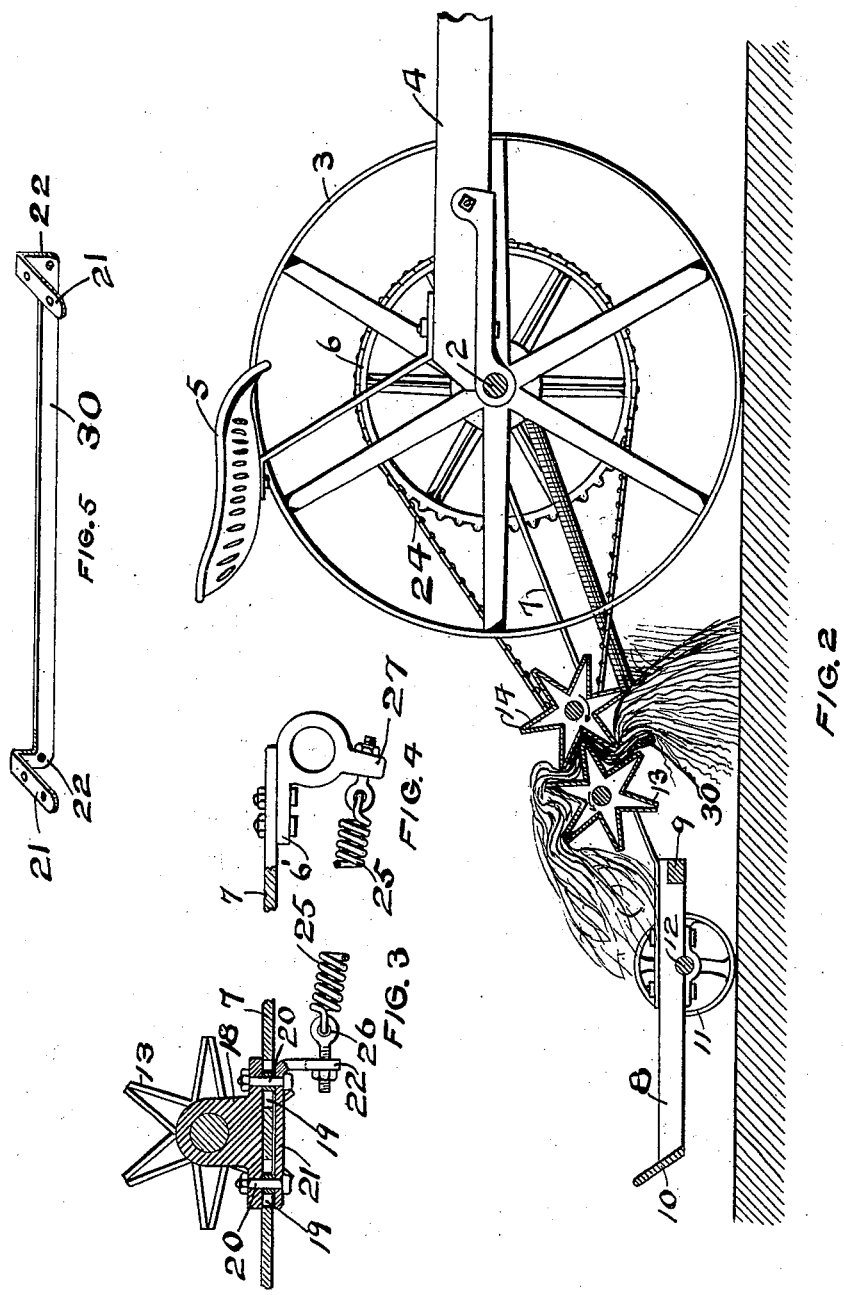
WITNESSES:
INVENTOR
RICHARD RUSSELL
BY
Paul H Hawley
ATTORNEY.

UNITED STATES PATENT OFFICE.

RICHARD RUSSELL, OF STEPHEN, MINNESOTA.

WEED-PULLER.

SPECIFICATION forming part of Letters Patent No. 639,618, dated December 19, 1899.

Application filed December 5, 1898. Serial No. 698,258. (No model.)

*To all whom it may concern:*

Be it known that I, RICHARD RUSSELL, of Stephen, Marshall county, Minnesota, have invented certain new and useful Improvements in Weed-Pullers, of which the following is a specification.

The invention relates to machines for pulling weeds from the soil; and the object of the invention is to provide means, in connection with a wheeled frame, for quickly and thoroughly removing weeds or stubble from a field.

A further object is to provide a weed-pulling device which shall also be adapted for pulling flax.

The invention consists generally in revolving coacting reels or beaters supported upon a wheeled frame and adapted to engage the stalks of weeds, flax, or stubble and remove the same from the soil as the reels or beaters revolve.

Further, the invention consists in providing means for holding one of the reels in yielding engagement with the other.

Further, the invention consists in various constructions and combinations, all as hereinafter described, and particularly pointed out in the claims.

In the accompanying drawings, forming part of this specification, Figure 1 is a perspective view of a weed-pulling machine embodying my invention. Fig. 2 is a longitudinal sectional view showing the position of the reels while engaging and pulling the weeds or stubble from the soil. Fig. 3 is a detail of the movable bearing of one reel. Fig. 4 is a detail of the support for the forward end of the springs. Fig. 5 is a view of a bar arranged beneath the rear reel, which serves to direct the stubble and weeds into the space between the reels.

In the drawings, 2 is the axle or shaft, from which the reels are operated; 3, the axle-wheels, supporting the forward end of the reel-frame; 4, the tongue, connected to the axle; 5, a seat for the driver, and 6 large sprocket-wheels secured on the ends of the axle 2, outside the wheels 3. Loosely arranged on the axle 2, outside the wheels 3, are plates 6', to which the forward ends of backwardly-extending bars 7 7 are secured, being supported, preferably, at their rear ends by a frame composed of side bars 8, connected by forward and rear cross-bars 9 and 10 and in turn supported by wheels 11, mounted on the shaft 12, arranged in bearings on the under side of the side bars 8, near the cross-bar 9.

The reels or beaters 13 and 14 are mounted on the bars 7, preferably at a point just back of the wheels 3 at such a distance from the ground that they will readily engage the stalks of weeds, stubble, or flax to pull the same from the soil. These reels or beaters may be made of any suitable material, preferably wood, and in cross-section are, as shown, in the form of a six-pointed star, though any other suitable form may be adopted, if preferred. The forward driving reel or beater 14 is mounted on a shaft 15, supported in fixed bearings 16 upon the upper side of the bars 7. This reel or beater has no other movement than a revolving movement with the shaft on which it is mounted. The second or driven reel 13 is mounted on a shaft 17, also supported in bearings 18, corresponding to the bearings 16 and arranged, preferably, just in the rear of the bearings 16 upon the bar 7. These bearings 18 are not, however, fixed on the bars 7, but move back and forth in slots 19, provided therein, and are held in position by bolts 20, extending through said slots, said bolts also passing through a plate 21, having a downwardly-bent forward end 22 for the purpose hereinafter described.

Upon each end of the shaft 15 I provide small sprockets 23, over which chains 24 pass to the large sprockets 6, heretofore described, and by means of which power is transmitted from the axle to the shaft 15 to drive the reels. As heretofore stated, the bearings for the reels are placed near together, so that the reels will be in close proximity to each other, and as the forward reel is driven through the medium of the sprockets and chains its wings will engage the wings of the rear reel and revolve it also. In order that the stalks of weeds or stubble may be guided between the reels, I provide a cross-bar 30, extending across the machine beneath the rear reel and having vertical extensions 22 and backwardly-turned ends 21, secured to the side bars 7.

In order that the rear reel, which is mounted in movable bearings, may be held close to or in engagement with the forward reel while at work, I provide strong spiral springs 25, having their rear ends adjustably secured to the ends 22 of the bar 30 by an eyebolt 26 and their forward ends secured in a similar manner to downwardly-extending lugs 27, provided on the plates 6' on the axle and to which the forward ends of the bars 7 are rigidly secured. When these springs are placed under proper tension, the rear reel will be drawn forward in its movable bearings until its wings engage or are in close contact with the wings of the forward reel as it is revolved.

The operation of the machine is as follows: The springs having been adjusted to the proper tension to hold the rear reel in its proper position with reference to the forward reel, the machine is started across the field, and as the forward reel revolves its wings engage the rear reel, revolving it also and causing the stalks of weeds, flax, or stubble which have been directed up between the wings of the reels by the cross-bar 30 to be fed into the space and caught between the wings of the reels and quickly dragged out of the soil as the reels are revolved. As the stalks pass up through between the reels they are carried by the wings of the rear reel over onto the frame which supports the rear of the apparatus, and from thence they fall to the ground or may be collected thereon and taken off after the field has been crossed.

The rear reel being mounted in movable bearings may be adjusted by means of the coil-springs for any desired tension, depending upon the size of the stalks of weeds which it is desired to collect. While I have shown the apparatus connected to a wheeled frame such as is ordinarily used with mowing-machines, I may, if preferred, connect the apparatus to a hay-rake and drive the reels from the gear thereof. The reel-frame, pivotally supported at its forward end by the axle and at its rear end by the trucks 11, will readily conform to the inequalities of the surface over which it is passing, and the rapidly-revolving reels will drag out by the roots all weeds, stubble, &c., and thoroughly clear the soil of all undesirable vegetation.

While I have shown only two reels mounted upon the frame and adapted to engage the stalks of weeds, stubble, or flax and pull them up by the roots, I may increase the number of reels or beaters, arranging them in such a position that if the forward reels do not clear the ground of all the weeds and undesirable vegetation the next set of reels following behind will complete the work. It is obvious that various modifications of the details of construction might be made by any one skilled in the art, and I therefore do not confine myself to the construction herein shown and described.

Having thus described my invention, I claim as new and desire to secure by Letters Patent—

1. The combination, in a weed-pulling machine, with a wheeled frame, of revolving coacting reels or beaters mounted thereon in position to engage the stalks of weeds or stubble, means for revolving said reels or beaters and a cross-bar supported beneath and in the rear of the forward reel, substantially as described.

2. The combination, in a weed-pulling machine, with an axle and its wheels, of a frame supported thereon, a reel mounted upon said frame, means for driving said reel, a second reel also mounted upon said frame in the rear of said first-named reel, and both of said reels being provided with coacting wings or beaters whereby when said first-named reel is operated its wings will engage the wings of the second reel and operate it also, substantially as described.

3. The combination, in a weed-pulling machine, with an axle and its wheels, of a frame mounted thereon, a reel mounted upon said frame, means for driving said reel, a second reel mounted in sliding bearings upon said frame in the rear of said first-named reel, both of said reels having coacting wings whereby when one is revolved the other will be revolved also, and means for holding said second-named reel toward said first-named reel with a yielding pressure, substantially as described.

4. In a weed-puller, the combination, with a wheeled frame, of reels mounted thereon, one in the rear of the other, each reel having coacting wings whereby the revolution of one will drive the other, means for driving the forward reel, and means provided beneath the reels for directing the stalks of weeds or stubble into position to be engaged by said coacting wings, substantially as described.

5. The combination, with the axle and its wheels, of the bars, secured to the axle, means supporting the rear ends of said bars, forward and rear reels mounted upon said bars in fixed and movable bearings, respectively, said reels having coacting wings, means for holding the rear reel toward the other with a yielding pressure, and means for driving the forward reel, substantially as described.

In witness whereof I have hereunto set my hand this 28th day of November, 1898.

RICHARD RUSSELL.

In presence of—
JAMES B. MAIN,
GREELEY E. CARR.